Figure 1:
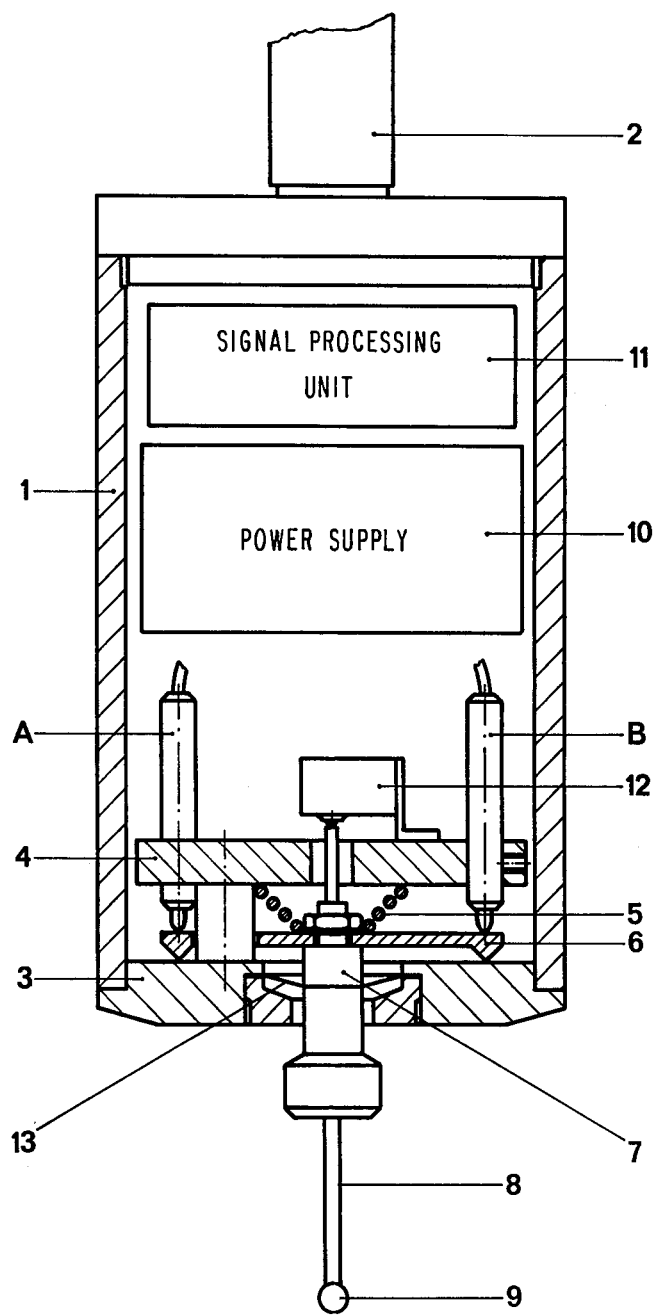

United States Patent [19]

Nilsson

[11] 4,203,225
[45] May 20, 1980

[54] POSITION INDICATOR FOR CONTROL MEASUREMENTS OF SURFACES

[75] Inventor: Gunnar Nilsson, Eskilstuna, Sweden

[73] Assignee: AB CE Johansson, Eskilstuna, Sweden

[21] Appl. No.: 943,108

[22] Filed: Sep. 18, 1978

[30] Foreign Application Priority Data

Sep. 20, 1977 [SE] Sweden ................................ 7710507

[51] Int. Cl.$^2$ .......................... G01B 7/00; G01B 7/28
[52] U.S. Cl. .................................. 33/174 L; 33/169 R
[58] Field of Search ............... 33/1 M, 169 R, 172 E, 33/174 P, 174 L, 174 PC

[56] References Cited

U.S. PATENT DOCUMENTS

| | | | |
|---|---|---|---|
| 3,766,653 | 10/1973 | McKay, Sr. | 33/174 L |
| 3,869,799 | 3/1975 | Neuer et al. | 33/169 R |
| 3,883,956 | 5/1975 | Zeewy et al. | 33/174 L |
| 4,084,323 | 4/1978 | McMurtry | 33/174 L |
| 4,118,871 | 10/1978 | Kirkham | 33/174 PC |

FOREIGN PATENT DOCUMENTS

| | | | |
|---|---|---|---|
| 2217174 | 12/1972 | Fed. Rep. of Germany | 33/174 L |
| 2232858 | 1/1973 | Fed. Rep. of Germany | 33/174 L |
| 2611781 | 10/1976 | Fed. Rep. of Germany | 33/174 L |
| 2535249 | 2/1977 | Fed. Rep. of Germany | 33/169 R |
| 2742817 | 4/1978 | Fed. Rep. of Germany | 33/174 L |

*Primary Examiner*—Richard R. Stearns
*Attorney, Agent, or Firm*—Fisher, Christen & Sabol

[57] ABSTRACT

An indicator for comparing the result produced on a surface by a machine tool with the desired result includes an elongated sensor arm mounted on a plate displaceably supported in a housing, the displaceable support including a number of yieldable position indicators which generate signals corresponding to the amount of movement of the sensor with respect to the housing.

4 Claims, 4 Drawing Figures

POSITION INDICATOR FOR CONTROL MEASUREMENTS OF SURFACES

The present invention refers to a position indicator to be used in control measurements of surfaces, e.g. surfaces having been subject to treatment in a machine tool, whereby the position indicator comprises a measuring probe arranged in a measurement casing, the probe by the measurement casing being brought along the coordinate lines which the surface should have obtained and the relative movement between the probe and the casing constituting a measure of the discrepancy of the surface from the desired shape.

Control measurement of work pieces which have been subject to treatment in numerically controlled machine tools is usually performed by conventional measuring tools such as sliding calipers, micrometers or similar means. These measurement methods are usually very time consuming and often give false measuring values. In order to speed up, the measuring procedure and to decrease the risk of obtaining false values, measuring means have recently been developed which are mounted in the spindle of the machine tool in the position of the tool after treatment, whereafter the measuring means is brought across the treated surface and generates measuring signals for control measurement of the surface. An example of such device is shown in the Swedish allowed patent publication 393 313. The disadvantage of the designs in this area is however that the positions of the measuring probes within the measuring range can not be calculated from only one measurement.

It is an object of the present invention to provide a device to be used e.g. in numerically controlled machine tools for control measurement of the treated surface whereby it is possible in a simple manner directly to obtain measuring values of the discrepancies of the surface in two or three coordinate directions alternatively. The characteristics of the invention will appear from the claims attached to the specification.

The invention will now be described in detail reference being made to enclosed drawing in which;

FIG. 1 shows a cross section through a device according to the invention and

Figure 2A:
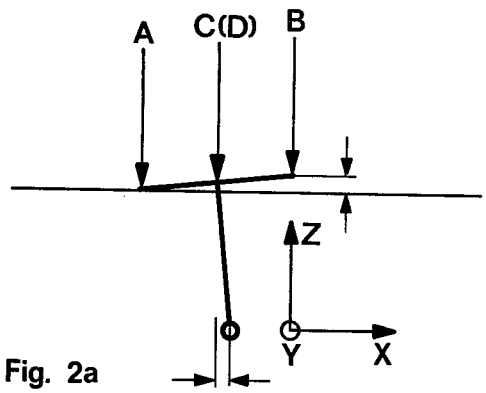
Figure 2B:
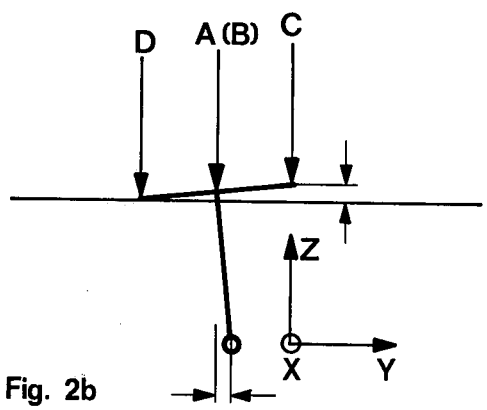
Figure 2C:
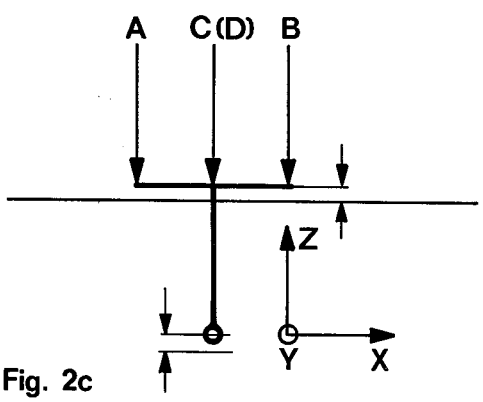

FIGS. 2a–c schematically show how measurement values are obtained from the device according to FIG. 1.

In FIG. 1 which shows a section through a device according to the invention, reference 1 denotes a casing which is attached to an arm 2 which can be the arm that normally carries the tool in a machine tool. At the bottom 3 of the casing a measuring probe is arranged, the probe consisting of a spherical sensor 9 which via an arm 8 is attached to a holder 7 which is connected to the bottom 3 via a membrane 13. The membrane allows the holder 7 to be axially displaceable and to be tilted in the casing. At the upper end of the holder there is arranged a plate 6 which by a spring 5 at rest is pressed against the bottom 3. The spring is thereby arranged between the plate and a position indicator holder 4 attached to the casing, the holder carrying four indicators A, B, C and D evenly distributed around the casing whereby for simplicities sake only the indicators A and B are shown in the figure. The indicators are of a conventional type e.g. using a differential transformer and generate output signals proportional to the vertical displacement of the indicator pins. As appears from the figure these pins are in contact with the plate 6. The output signals of the indicators are supplied to an electronic signal processing unit 11 which is connected to a power supply 10. The electronic unit 11 is activated by a switch 12 which is affected when the sensor 9 is brought off its rest position. From the electronic units 11 the processed signals from the indicators A, B, C and D are supplied suitably in a wireless mode to a presentation unit of a conventional type.

The operation of the above described device will now be explained in detail from FIGS. 2a–c which schematically show the relation between the output signals from the indicators A, B, C and D and the movements of the sensor 9. When a surface is to be controlled the casing is arranged so as to bring the sensor 9 in contact with the surface whereafter the casing is brought along coordinate lines parallell with shape the treated surface is supposed to have obtained. If the shape of the surface thereby deviates from the desired shape the sensor 9 will move relative the casing 1. In FIG. 2 there is shown how these relative movements affect the indicators. As appears from FIGS. 2a and b the horizontal movement of the sensor along the x and y coordinate axis respectively will be proportional to the difference between the output signals from the indicators A, B and C, D respectively, whereas a vertical movement gives raise to an indicator output proportional to the sum of the output. To obtain measuring values corresponding to the movement of the sensor in all three coordinate directions will thus be very simple. There is furthermore realised that in order to determine the exact position of the plate 6 only three indicators are required although the signal treatment will thereby be somewhat more complicated. If a determination only in two coordinate directions is required only two indicators will be required.

We claim:

1. A position indicator to be used for control measurements of surfaces which have been subjected to treatment by a machine tool or the like, comprising;
    a housing having an end wall provided with an opening therein;
    a measuring probe movably mounted in the housing and projecting outwardly through said opening, the relative movement between the probe and the housing constituting a measurement of the discrepancy of the surface from the desired shape;
    the mounting for the probe comprising a plate attached to the probe transversely of the axis thereof;
    biassing means urging the periphery of said plate into abutting contact with the inner side of said end wall, whereby the probe is axially displaceable by contact with a surface and tiltable in all directions about the periphery of said plate, and;
    a plurality of indicator means for generating output signals corresponding to the displacement of the periphery of the plate with respect to the end wall of the housing.

2. Position indicator according to claim 1, characterized in, that the number of indicators is two which allows a determination of the sensor with respect to two coordinate directions.

3. Position indicator according to claim 1, characterized in, that the number of indicators is at least three which allows a determination of the sensor with respect to three coordinate directions.

4. Position indicator according to claim 1, characterized in, that the position indicators are of a differential transformer type.

* * * * *